United States Patent
Roo

(10) Patent No.: US 6,775,529 B1
(45) Date of Patent: Aug. 10, 2004

(54) ACTIVE RESISTIVE SUMMER FOR A TRANSFORMER HYBRID

(75) Inventor: Pierte Roo, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 569 days.

(21) Appl. No.: 09/629,092

(22) Filed: Jul. 31, 2000

(51) Int. Cl.[7] .......................... H04B 1/10; H04B 3/20; H04B 1/38

(52) U.S. Cl. .................... 455/296; 455/295; 455/278.1; 455/63.1; 455/67.13; 455/570; 370/286; 370/289

(58) Field of Search ............................ 455/63.1, 67.13, 455/278.1, 295, 296, 570, 78

(56) References Cited

U.S. PATENT DOCUMENTS

| | | |
|---|---|---|
| 4,112,253 A | 9/1978 | Wilhelm |
| 4,152,541 A | 5/1979 | Yuen |
| RE30,111 E | 10/1979 | Blood, Jr. |
| 4,393,494 A | 7/1983 | Belforte et al. |
| 5,307,405 A | 4/1994 | Sih |
| 5,388,092 A | 2/1995 | Koyama et al. |
| 5,517,435 A | 5/1996 | Sugiyama |
| 5,539,773 A | 7/1996 | Knee et al. |
| 5,596,439 A * | 1/1997 | Dankberg et al. ........... 359/161 |
| 5,659,609 A | 8/1997 | Koizumi et al. |
| 5,666,354 A | 9/1997 | Cecchi et al. |
| 5,796,725 A | 8/1998 | Muraoka |
| 5,822,426 A | 10/1998 | Rasmus et al. |
| 5,825,819 A | 10/1998 | Cogburn |
| 5,864,587 A | 1/1999 | Hunt |
| 5,940,498 A * | 8/1999 | Bardl .......................... 379/394 |

FOREIGN PATENT DOCUMENTS

| | | |
|---|---|---|
| EP | WO 99/46867 | 9/1999 |
| EP | WO 00/27079 | 5/2000 |
| EP | WO 00/28663 | 5/2000 |
| EP | WO 00/28691 | 5/2000 |
| EP | WO 00/35094 | 6/2000 |

OTHER PUBLICATIONS

U.S. patent application Ser. No. 09/629,095, Roo, filed Jul. 31, 2000.
U.S. patent application Ser. No. 09/920,241, Roo, filed Aug. 1, 2001.
A.S. Sedra, et al., "Operational Amplifiers", Microelectronic Circuits, Saunders College Publishing, Third Edition, Chapter 2, (1991), pp. 48, 61–63.

* cited by examiner

Primary Examiner—Vivian Chin
Assistant Examiner—Eugene Yun

(57) ABSTRACT

An electrical circuit in a communications channel is provided. The electrical circuit includes an active resistive summer. The active resistive summer has a composite signal as an input. The composite signal includes a transmission signal component and a receive signal component. A replica transmission signal is also an input to the active resistive summer. The active resistive summer includes the receive signal component as an output.

55 Claims, 5 Drawing Sheets

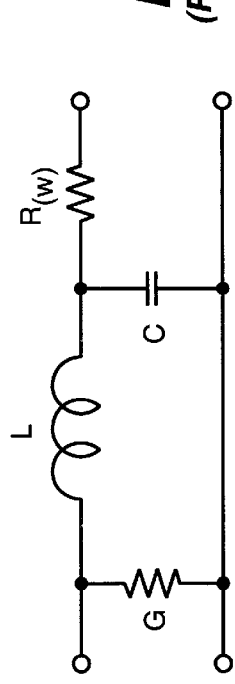
FIG._1
*(PRIOR ART)*
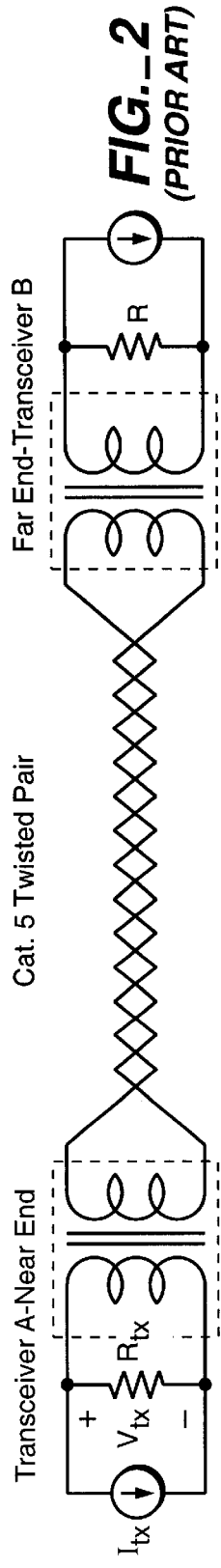
FIG._2
*(PRIOR ART)*
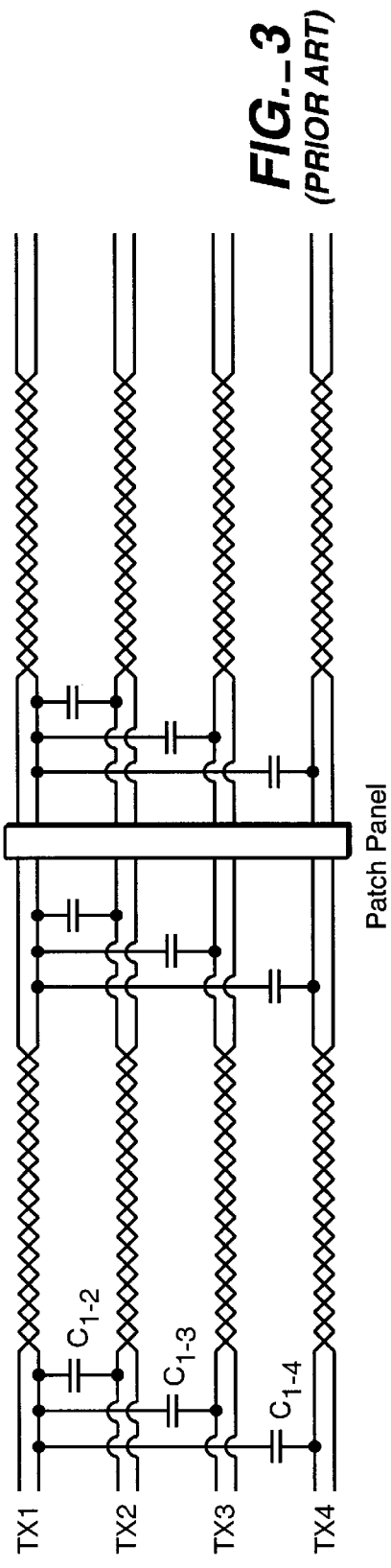
FIG._3
*(PRIOR ART)*

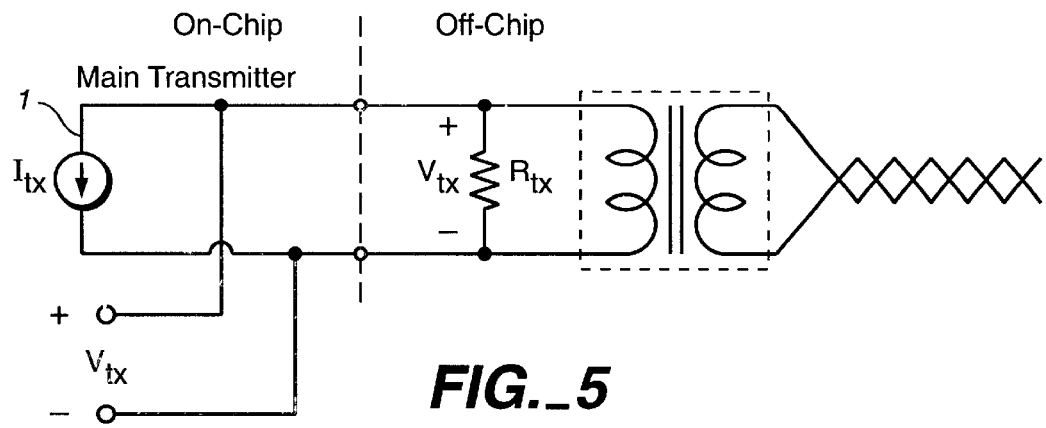
FIG._5
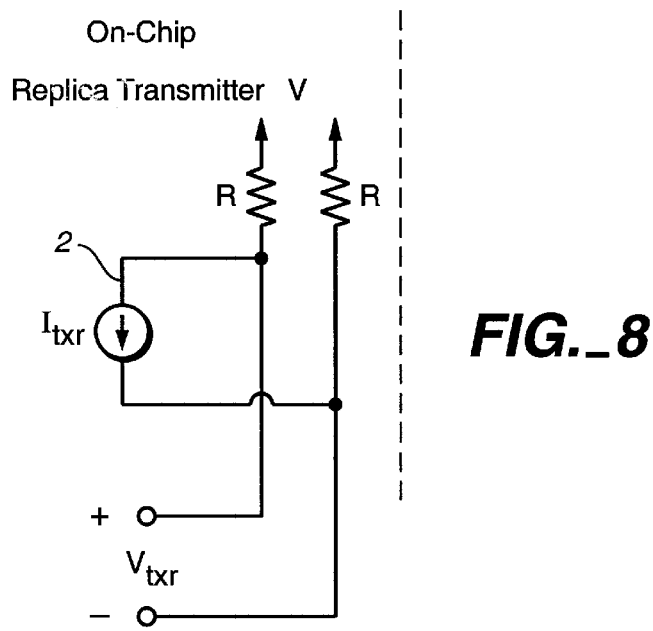
FIG._8
FIG._10

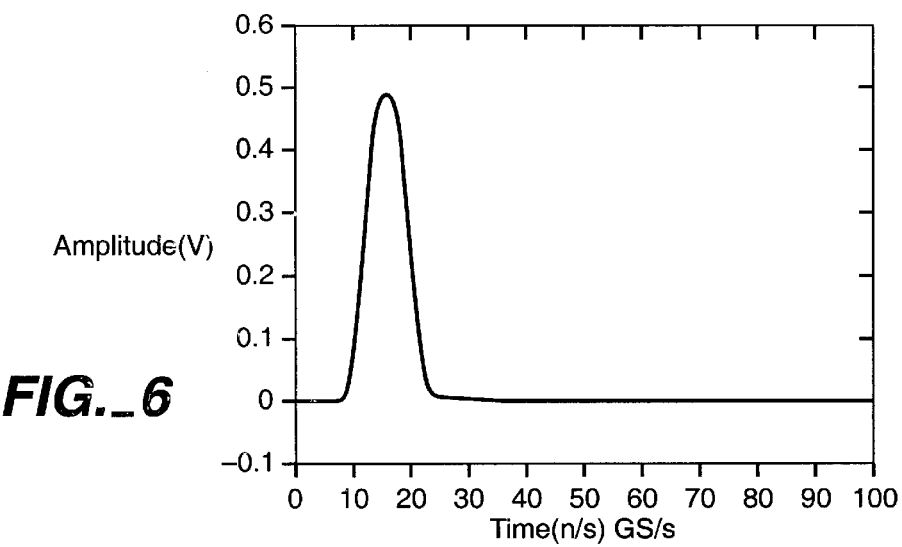
FIG._6
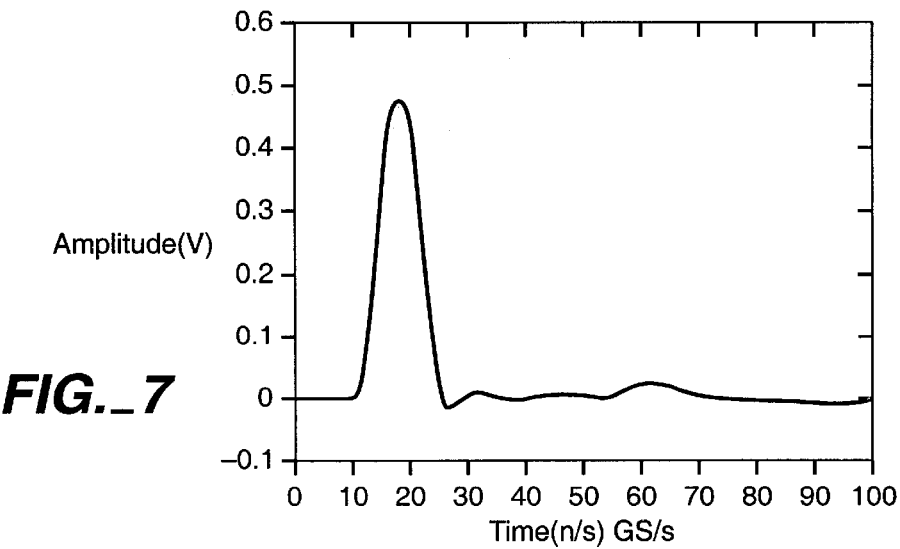
FIG._7
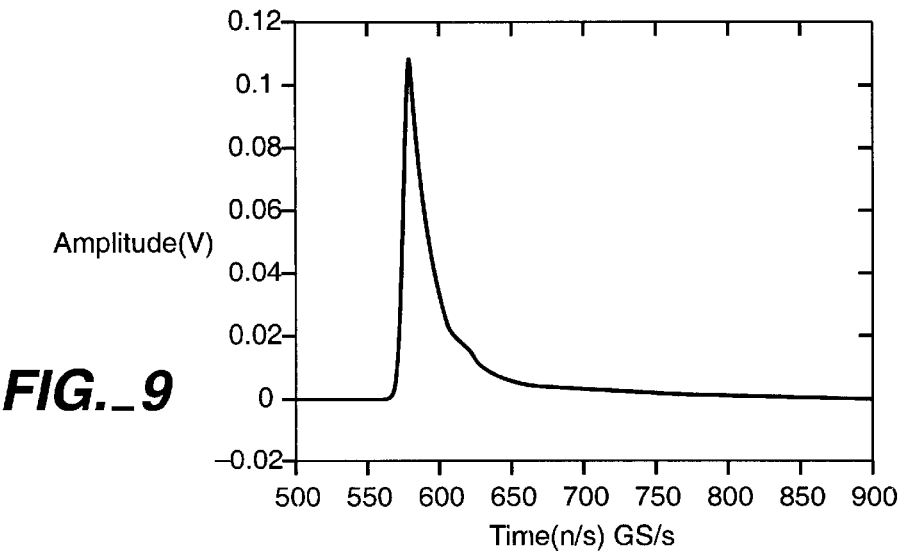
FIG._9

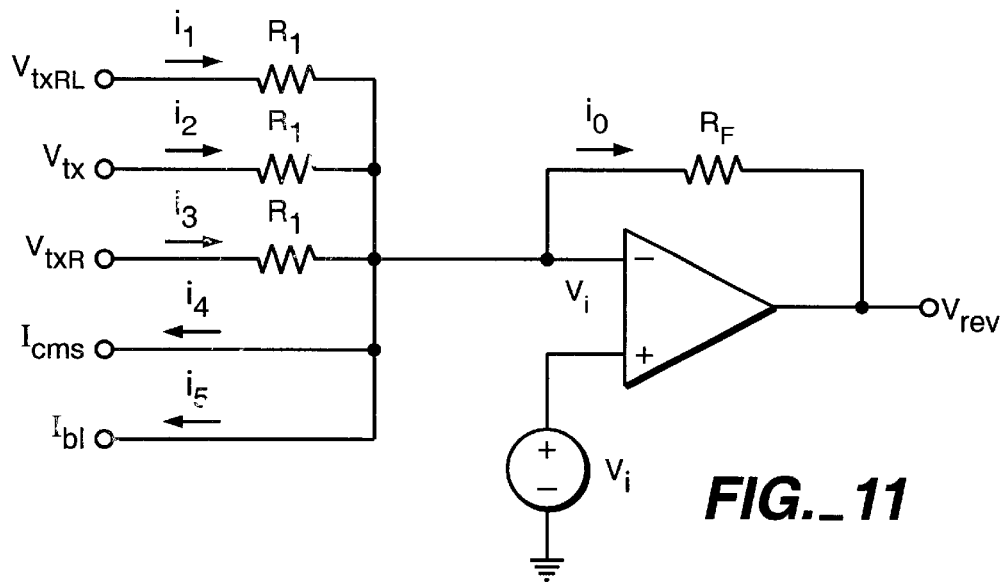
FIG._11
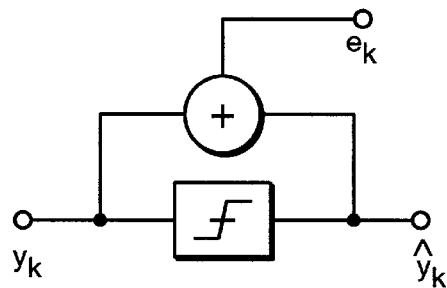
FIG._12
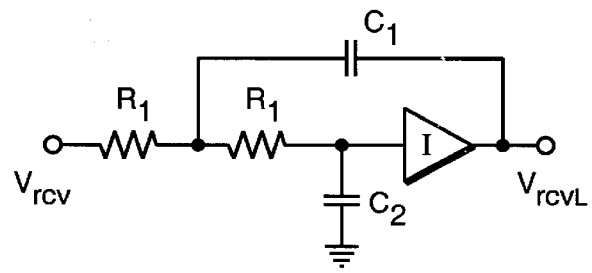
FIG._13
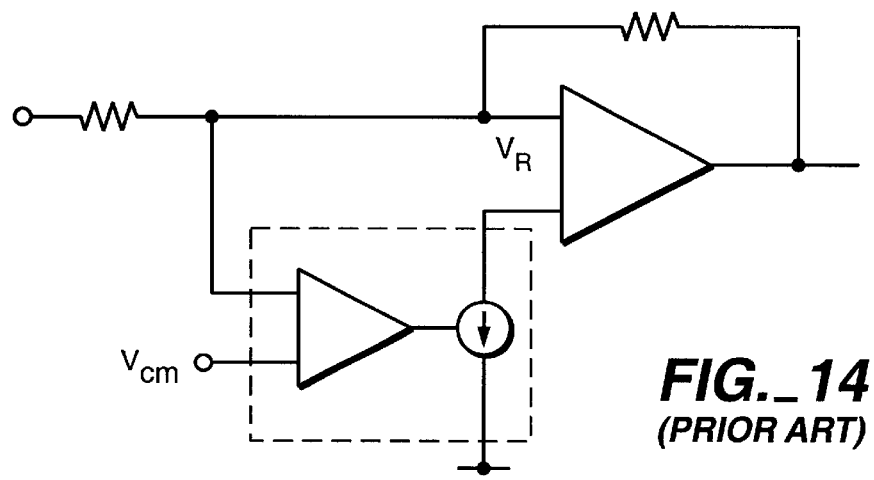
FIG._14
(PRIOR ART)

ACTIVE RESISTIVE SUMMER FOR A TRANSFORMER HYBRID

BACKGROUND OF THE INVENTION

1. Field of the Invention

The present invention relates generally to transmitting and receiving electrical signals through communication channels, such as a gigabit channel. In particular, the present invention relates to a transmit canceller that removes transmit signals from receive signals in such communication channels.

2. Background and Related Art

A gigabit channel is a communications channel with a total data throughput of one gigabit per second. A gigabit channel typically includes four (4) unshielded twisted pairs (hereinafter "UTP") of cables (e.g., category 5 cables) to achieve this data rate. IEEE Standard 802.3ab, herein incorporated by reference, specifies the physical layer parameters for a 1000BASE-T channel (e.g., a gigabit channel).

As will be appreciated by those skilled in the art, a UTP becomes a transmission line when transmitting high frequency signals. A transmission line can be modeled as a network of inductors, capacitors and resistors, as shown in FIG. 1. With reference to FIG. 1, G is normally zero and $R(\omega)$ is complex due to skin effect. $R(\omega)$ can be defined by;

$$R(\omega) = k_R(1+j)\sqrt{\omega}, \quad (1)$$

where $k_R$ is a function of the conductor diameter, permeability, and conductivity. The characteristic impedance of the line is defined by:

$$Z_0 = \sqrt{\frac{R(\omega) + j\omega L}{G + j\omega C}}, \quad (2)$$

and at high frequencies $Z_0$ becomes approximately $\sqrt{L/C}$ or approximately 100 ohms in a typical configuration. When properly terminated, a UTP of length d has a transfer function H that is a function of both length (d) and frequency ($\omega$):

$$H(d,\omega) = e^{d\gamma(\omega)}, \quad (3)$$

where $$\gamma(\omega) = \sqrt{(R(\omega) + j\omega L)(G + j\omega C)}, \quad (4)$$

and substituting Equations 1 and 4 into Equation 3, and simplifying, approximately yields:

$$H(d, \omega) \approx \exp\left\{d\left[\frac{k_R}{2}\sqrt{\frac{\omega L}{C}} + j\left(\omega\sqrt{LC} + \frac{k_R}{2}\sqrt{\frac{\omega L}{C}}\right)\right]\right\}. \quad (5)$$

Equation 5 shows that attenuation and delay are a function of the cable length d.

A transmission path for a UTP typically includes a twisted pair of cables that are coupled to transformers at both a near and far end, as shown in FIG. 2. A transceiver at each end of the transmission path transmits and receives via the same twisted pair. A cable typically includes two patch cords totaling less than 10 m, and a main section of 100 m or even longer. The transmitters shown in FIG. 2 are modeled as current sources. The near end current source supplies a current $I_{tx}$. The near end transmit voltage (e.g., $I_{tx}R_{tx}$) is detected and measured across resistor $R_{tx}$. A receive signal $V_{rcv}$ (e.g., a signal transmitted from the far-end transceiver) is also detected and measured across resistor $R_{tx}$. Hence, $V_{tx}$ includes both transmit ($I_{tx}R_{tx}$) and receive ($V_{rcv}$) signals. Accordingly, the signal $V_{rcv}$ (e.g., the signal from Transceiver B) received at Transceiver A can be obtained by taking the difference between the transmit voltage and the measured voltage $V_{tx}$, as follows:

$$V_{rcv} = V_{tx} - I_{tx}R_{tx}, \quad (6)$$

Conventional solutions for removing transmit signals from receive signals often employ known transconductor ("Gm") summing stages or other current based methods. As will be appreciated, these methods often introduce signal distortion into the receive signal. Also, some transconductors have a limited signal dynamic range. Accordingly, conventional methods are often inadequate for applications requiring signal recovery. Additionally, known summing circuits, such as weighted summers using operational amplifiers, have not heretofore been modified to accommodate the intricacies associated with canceling transmit signals or regulating baseline wander (described below). A known weighted summer is discussed in Chapter 2 of "Microelectronic Circuits, Third Edition," by A. S. Sedra and K. C. Smith, 1991, incorporated herein by reference.

As will be appreciated by those skilled in the art, the receive signal $V_{rcv}$ typically contains additional components, due to baseline wander, echoes and crosstalk, for example.

Baseline wander is preferably corrected for when transmitting and receiving signals over transmission lines. Removing DC components from a receive signal using transformer coupling can cause baseline wander. As will be appreciated by those skilled in the art, baseline wander represents a deviation from an initial DC potential of a signal.

"Echoes" typically represent a residual transmit signal caused by reflections that appear in the receive signal. Echoes can cause undue interference depending on the size of the reflection.

Capacitive coupling between the channels, as shown in FIG. 3, causes crosstalk. Four channels TX1–TX4 are shown in FIG. 3. The capacitive coupling between TX1 and each of TX2, TX3 and TX4 are modeled by capacitors $C_{1-2}$, $C_{1-3}$, $C_{1-4}$, respectively. The capacitive coupling forms a high-pass filter between channels and therefore crosstalk contains mostly high frequency components. As will be appreciated by those skilled in the art, normally only the near-end crosstalk (NEXT) needs to be considered, since crosstalk is usually small and the transmission line provides further attenuation of the far-end crosstalk (FEXT).

Accordingly, there are many signal-to-noise problems to be solved in the art. Hence, an efficient transmission canceller is needed to remove a transmit signal from a receive signal without introducing excess signal distortion. An electrical circuit is also needed to subtract a transmit signal from a receive signal. There is a further need of an electrical circuit to correct baseline wander.

SUMMARY OF THE INVENTION

The present invention relates to a transmit signal canceller for use in a transformer hybrid. Such a hybrid includes a junction for transmitting and receiving signals. In the present invention, an active resistive summer can be used to cancel a transmit signal from a receive signal.

According to the invention, an electrical circuit in a communications channel is provided. The electrical circuit includes an active resistive summer having: (i) an input for a composite signal, the composite signal including a transmission signal component and a receive signal component, (ii) an input for a replica transmission signal, and (iii) an output for a receive signal which includes the composite signal minus the replica signal.

According to an another aspect of the present invention, a transmit signal canceller in a communication channel is provided. The channel includes a first transceiver for transmitting and receiving signals and a replica transmitter for generating a replica transmission signal input. A composite signal at a rear end includes a transmission signal of the first transceiver and a received signal of a second transceiver. The transmit canceller includes: (i) an operational amplifier having a positive input terminal, a negative input terminal, and an output terminal; (ii) a feedback element in communication with the negative input terminal and the output terminal; (iii) a first input resistor in communication with the negative input terminal and the measured signal input; (iv) a second input resistor in communication with the negative input terminal and the replica signal input; and (v) a predetermined voltage source in communication with the positive terminal of the operational amplifier. The receive signal is an output at the output terminal of the operational amplifier.

According to still another aspect of the present invention, a communication system including a first transmission channel with a first end and a second end is provided. The first end couples to a first transformer and the second end couples to a second transformer. A first transceiver transmits and receives signals via the first transformer and a second transceiver transmits and receives signals via the second transformer. A first signal is supplied at the near end. The first signal includes a transmission signal component of the first transceiver and a receive signal component of the second transceiver. The communications system includes: (i) a replica transmitter that generates a replica of the transmission signal component of the first transceiver; (ii) a filter to filter the replica signal; (iii) an active resistive summer receiving the first signal, and the filtered replica signal as inputs to reduce the transmission signal component at an output of the active resistive summer.

According to still another aspect of the present invention, a method of correcting baseline wander in a receive signal in a communications channel having a near and far end is provided. The channel includes a first transceiver at the near end and a second transceiver at the far end, each to transmit and receive signals. The method includes the steps of: (i) providing a composite signal, the composite signal including a transmission signal of the first transceiver and a receive signal of the second transceiver; (ii) generating a replica of the transmission signal; (iii) subtracting the replica signal from the composite signal through an active resistive summer; and (iv) providing a baseline correction current into the active resistive summer.

These and other objects, features, and advantages of the present invention will be apparent from the following description of the preferred embodiments of the present invention.

BRIEF DESCRIPTION OF THE DRAWINGS

The details of the present invention will be more readily understood from a detailed description of the preferred embodiments taken in conjunction with the following figures.

FIG. 1 is a circuit diagram illustrating a transmission line model.

FIG. 2 is a circuit diagram illustrating a transmission path across a twisted pair of cables, the cables being coupled to transformers at each end.

FIG. 3 is a diagram-illustrating crosswalk between channels in a gigabit channel.

FIG. 5 is a circuit diagram illustrating a transmitter.

FIG. 6 is a graph illustrating a transmit signal.

FIG. 7 is a graph illustrating a composite signal with echoes.

FIG. 8 is a circuit diagram illustrating a replica transmitter.

FIG. 9 is a graph illustrating a receive signal.

FIG. 10 is block diagram illustrating a low-pass filter.

FIG. 11 is a circuit diagram illustrating an active resistive summer.

FIG. 12 is a circuit diagram illustrating an error detection circuit.

FIG. 13 is a circuit diagram illustrating a low-pass filter.

FIG. 14 is a circuit diagram illustrating a conventional voltage controlled current source.

DETAILED DESCRIPTION OF THE PRESENTLY PREFERRED EMBODIMENTS

Figure 4:
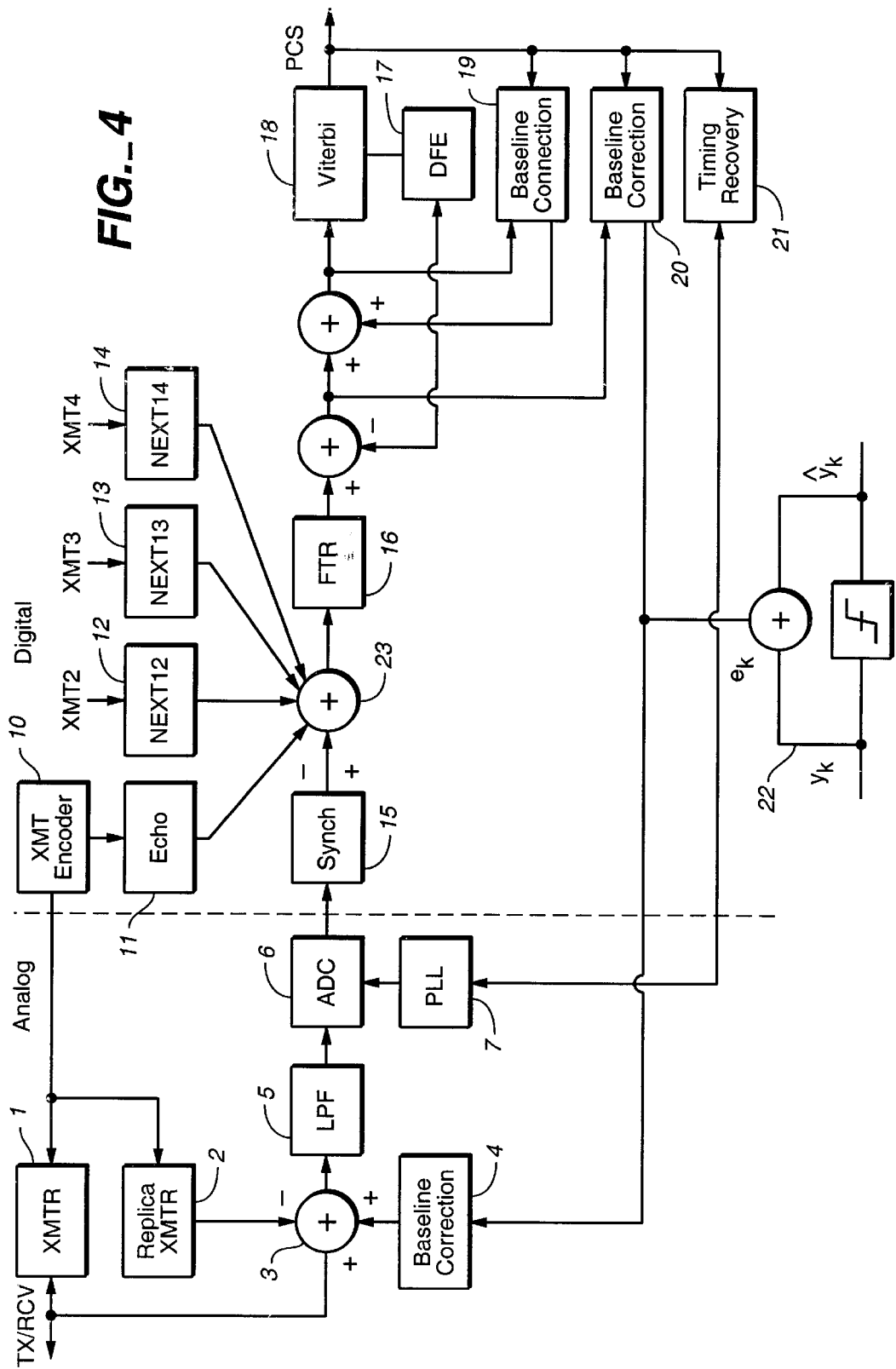
FIG. 4 is a block diagram illustrating a system overview of a communications channel.

The preferred embodiments will be described with respect to a gigabit channel, as used, for example, in an Ethernet network; and to electrical circuits associated with separating transmit and receive signals in such a gigabit channel. The preferred embodiments will also be described with respect to baseline wander correction in such a gigabit channel. However, as will be appreciated by those skilled in the art, the present invention is also applicable to other transmission channels, and to other electrical circuits having applications requiring cancellation of transmit signals, for example.

FIG. 4 is a block diagram illustrating principle components for one of the four channels in a preferred gigabit channel configuration for use in an Ethernet network. As illustrated in FIG. 4, a vertical dashed line divides analog and digital processing components. The analog components preferably include a transmitter ("XMTR") 1, replica transmitter ("Replica XMTR") 2, transmit canceller 3, baseline correction module 4, low pass filter ("LPF") 5, analog-to-digital converter ("ADC") 6, and phase-lock loop ("PLL") 7.

A known PLL can be used with the present invention.

Digital processing components preferably include a transmitter encoder 10, echo module 11, NEXT cancellers 12–14 to assist in removing echoes, synchronization module 15, FIR (Finite Impulse Response) equalizer 16 and a DFE (Decision Feedback Equalizer) 17 to equalize a receive signal, and a Viterbi module 18. The digital processing components also include baseline correction modules 19 and 20 to correct residual baseline wander. A timing recovery module 21, an error correction detector 22 (described in further detail below), and summing junction 23 are also shown. The individual digital components designated by blocks in FIG. 3 are all well known in the communication arts, and their specific construction and operation are not critical to the operation or best mode for carrying out the present invention.

The analog "front-end" components shown in FIG. 4 will now be described in even further detail. The front-end analog components are preferably designed and constructed via customized integrated circuits. However, as will be appreciated by those skilled in the art, the inventive circuits and corresponding configuration could also be realized using discrete components as well.

As illustrated in FIG. 5, transmitter 1 preferably includes a current-source $I_{tx}$ that generates a transmit signal over a resistor $R_{tx}$. An appropriated value for resistor $R_{tx}$ can be selected to match the line impedance, for example. In one preferred embodiment, a resistor center tap is set to 2.5 volts so the transmitter 1 effectively sees a differential impedance of 25 ohms. Preferred performance specifications for the transmitter 1 are further detailed in Table 1, below.

An impulse transmit signal can be generated from a unit square pulse of 1 T width filtered by a one-pole, low-pass filter (not shown) with a cutoff frequency between 85 MHz and 125 MHz. Slew-rate control can also be used to limit the rise and fall times and thus reduce the high frequency components of a transmit signal. Of course, any transmit signal preferably fits into the transmit template provided by the IEEE 802.3ab Standard. An ideal transmit pulse is shown in FIG. 6.

A measured voltage $V_{tx}$ across $R_{tx}$ (FIG. 5) is shown in FIG. 7. The measured signal $V_{tx}$ contains interference caused by line reflections (e.g., echoes). The reflections are caused by impedance discontinuity due to impedance mismatch between different cables. For example, a large reflection pulse at 60 ns as shown in FIG. 7 corresponds to a reflection from the impedance discontinuity at an adapter connecting a 5 m patch cord to a 100 m cable. The magnitude of the echoes can be significant when compared to the magnitude of the receive signal at a long line length, and therefore, echo cancellation, as provided by the NEXT cancellers 12–14 shown in FIG. 4, is employed.

A receive signal $V_{rcv}$ (e.g., a signal received from a far-end transceiver) is also measured across resistor $R_{tx}$, as shown in FIG. 5. Accordingly, the near end transmit signal ($I_{tx}R_{tx}$) is preferably canceled or reduced from the composite signal $V_{tx}$ in order to effectively recover the far-end received signal $V_{rcv}$. This type of active cancellation can be accomplished with a replica transmit signal $V_{txr}$. Accordingly, a replica transmitter 2 (to be described below) is provided to generate a signal $V_{txr}$ to be subtracted from the measured signal $V_{tx}$, thus, effectively reducing the transmit signal ($I_{tx}R_{tx}$).

A receive signal x(t) transmitted with pulse amplitude modulation ("PAM") is define by;

$$x(t) = \sum_{n=1}^{\infty} a \cdot p(t - nT), \tag{7}$$

where $a_n$ is the transmit symbols and p(t) is the channel pulse derived by convoluting an impulse transmit pulse with a channel response defined by Equation 5. The receive signal for a 100 m cable is heavily attenuated by the transmission line and the pulse width is dispersed, as shown in FIG. 9. A 100 m UTP delays the signal by about 550 ns. Signal equalization preferably uses high frequency boosting via the FIR 16 to remove precursor intersymbol interference ("ISI") and to insert a zero crossing for timing recovery 21. The DFE 17 is used to remove postcursor IST.

The receive signal's elongated tail results from transformer coupling (e.g., a high-pass filter) with a time constant (e.g., L/R) typically on the order of micro-seconds. Since the receive signal contains little or no average DC energy, the negative tail has the same amount of energy as the positive pulse. In this regard, the signal's area integral is zero. In a typical example, a tail can last over 10 μs with a magnitude of no more than 0.5 mV. The long tail causes any DC bias to drift back toward zero, which can lead to baseline wander. As will be appreciated, this response time is too long to be practically removed by a digital equalizer, but the response is slow enough to be cancelled using a slow integrator, for example. The baseline wander canceller 4 is preferably decision directed to minimize the error defined by the difference between the equalized value and it's sliced value, as discussed below.

As illustrated in FIG. 8, the replica transmitter 2 includes a current source $I_{txr}$. $I_{txr}$ is coupled to a voltage V through resistors R, as shown in FIG. 8. In a preferred embodiment, R is 100 ohms and V is about 2.5 volts. The replica signal $V_{txr}$ is preferably filtered through a known low-pass filter to obtain a low-pass replica signal ("$V_{txrl}$"), as shown in FIG. 10. Replica signal $V_{txr}$ can also be inverted in a known manner to produce $-V_{txr}$. The preferred performance specifications for the transmitter 1 and replica transmitter 2 are shown in Table 1.

TABLE 1

Transmitter and Replica Performance Specifications

| Parameters | Specifications |
| --- | --- |
| Transmit Current | +/−40 mA |
| Replica Transmit Current | ¼ of transmit current |
| Number of levels | 16 (not including 0) |
| Number of sub-units | 8 (sequentially delayed) |
| Transmit Profile | [1 1 2 2 1 1], w/~1 ns delay |
| Replica Transmit Profile | [1 1 3 3], w/~1 ns delay |
| $R_{tx}$ | 100 Ω |

A transmit signal canceller 4 is illustrated in FIG. 11. The transmit canceller 4 removes the transmission signal ($I_{tx}R_{tx}$) from the measured (or detected) transmit $V_{tx}$ signal. In particular, the transmit canceller includes an active resistive summer that provides a large input dynamic range and stable linearity characteristics, while removing (e.g., reducing or canceling) the unwanted transmit signal component.

As illustrated in FIG. 11, the active summer includes an operational amplifier ("op-amp") with inverting feedback. The op-amp is preferably constructed using integrated circuits in a known manner. The summer receives $V_{txrl}$, $V_{tx}$, $-V_{txr}$, $I_{cms}$, and $I_{bl}$ as input signals. $I_{bl}$ is a baseline wander control current, and $I_{cms}$ is a common-mode shift current, each as further discussed below.

As will be appreciated by those skilled in the art, a transformer typically has high-pass characteristics. Accordingly, replica signal $-V_{txr}$ is combined (e.g., subtracted via the active resistive summer) with the low pass replica signal $V_{txrl}$ to produce a high-pass replica signal. As an alternative configuration, $V_{txr}$ could be filtered through a known high-pass filter prior to the transmit canceller 3 stage.

Returning to FIG. 11, receive signal $V_{rcv}$ is determined from the following relationships.
Let:

$Vi$ = voltage for the op-amp's positive terminal;

$V_1 = V_{txrl}$;

$V_2 = V_{tx}$;

$-V_3 = -V_{txr}$;

$i_d = I_{cmz}$; and $i_5 = I_{bl}$.

Then:

(i) $i_1 + i_2 - i_3 - i_4 - i_5 = i_0$; and (8)

(ii) $\frac{V_1 - Vi}{R_1} = i_1$; $\frac{V_2 - Vi}{R_1} = i_2$;

$\frac{Vi - -V_3}{R_1} = i_3$; $\frac{Vi - Vrcv}{R_F} = i_0$.

$\Rightarrow \frac{V_1 - Vi}{R_1} + \frac{V_2 - Vi}{R_1} - \frac{Vi + V_3}{R_1} - i_4 - i_5 = \frac{Vi - Vrcv}{R_F}$ $\Rightarrow \frac{V_1 + V_2 - V_3 - 3Vi}{R_1} - i_4 - i_5 = \frac{Vi - Vrcv}{R_F}$ $\Rightarrow \frac{R_F}{R_1}(V_1 + V_2 - V_3 - 3Vi) - i_4 \cdot R_F - i_5 \cdot R_F = Vi - Vrcv$ $\Rightarrow \frac{R_F}{R_1}(V_1 + V_2 - V_3 - 3vi) - R_F i_4 - R_F i_5 - Vi = -Vrcv$ $V_{rcv} = V_1 - \frac{R_F}{R_1}(V_1 + V_2 - V_3 - 3Vi) + R_F(i_4 + i_5)$ Substituting the input signals for their placeholders yields the definition for $V_{rcv}$ as follows:

$V_{rcv} = Vi - \frac{R_F}{R_1}(Vtxrl + Vtx - Vtxr - 3Vi) + R_F(Icms + Ibl)$. (9)

The gain is preferably set between 0.75 and 1 (e.g., $R_F/R_1$ equals 0.75 to 1). For a small signal analysis, Vi can be set to zero (0). Also, as will be appreciated by those skilled in the art, in a fully differential circuit, Vi effectively drops out of the equations since $V_{rcv} = V_{rcv}^{(+)} - V_{rcv}^{(-)}$. As discussed, $V_{txrl}$ and $-V_{txr}$ are combined through the active summer to provide a high-pass replica signal "$V_{txrh}$"). The receive signal $V_{rcv}$ can then be recovered as shown by Equation 9.

Preferred transmit canceller specifications are detailed in Table 2, below.

TABLE 2

Transmit Canceller Performance Specifications

| Parameters | Specifications |
|---|---|
| Input Dynamic Range | +/−2.5 V (diff.) for transmit signal |
| Output Dynamic Range | +/−1 V (diff.) |
| Input impedance | High, ~10 k. |
| Output impedance | Low |
| Cutoff frequency | Greater than 31.5 Mhz |
| DC Gain | 0.85 - dependent on the LPF 5 and ADC 6 characteristics (FIG. 4) |
| Power | 25 mw, including LPF 5 (FIG. 4) |
| $R_f$ | 8.5 KΩ; or 7.5 KΩ for increased attenuation |
| Vi | 2.0 volts |
| $R_1$ | 10 KΩ |

A known current mode circuit, e.g., a voltage controlled current source (VCCS) as shown in FIG. 14, with feedback preferably sets the summer input current-mode voltage ($V_{cm}$). Of course, other known current mode circuits could be employed with the present invention. This current-mode circuit shifts the common-mode of both the transmit and replica transmit signals. The input to the op amp ($V_{aip}$, $V_{ain}$) is compared against the desired op amp output common-mode voltage ($V_d$):

$V_d = (V_{aip} - V_{cm}) + (V_{ain} - V_{cm})$, (10)

Then, the common-mode shift current can be determined from:

$I_{cms} = V_d g_m + I_0$, (11)

where $g_m$ is a transconductance and $I_0$ is an offset current. An appropriate transconductance and offset current can be selected by setting $V_{cm} = I_{cms} R_F = V_d g_m R_F + I_0 R_F$, to ensure a proper common-mode voltage seen by the op amp inputs. In this manner, the common mode shift current $I_{cms}$ can be regulated to pull down the common mode voltage of the operational amplifier as needed.

Baseline wander current $I_{bl}$ is also "summed" by the active resistive summer, as shown in FIG. 11, to correct baseline wander. Approximately ninety percent (90%) of all system baseline correction can be obtained through the active summer. The remaining baseline residual can be digitally corrected through an equalizer, for example. As will be appreciated, the FIG. 11 topology allows the current sources ($I_{bl}$ and $I_{cms}$) to each have a fixed output voltage, thus, minimizing current deviation due to finite output resistance.

The baseline wander correction module 4 preferably corrects for baseline wander using a decision-directed method, such as a discrete integrator. The decision-directed method can be implemented with a known charge pump, where the pump sign (e.g., +1/−1) is determined digitally using an error between the equalized baseline signal ($y_k$) and a sliced baseline signal ($\hat{y}_k$) as shown in FIG. 12. As will be appreciated by those skilled in the art, the expected error value (e.g., $E[e_k]$) is ideally driven to zero. The charge pump is preferably pumped up or down based on the error value. For example, a positive error implies that a negative value should be input into the charge pump. For a negative error, a positive value should be input into the charge pump. The charge pump preferably has at least two current settings to regulate $I_{bl}$. Of course, a charge pump with many current settings could be used to obtain finer baseline correction control.

The preferred baseline wander correction performance specifications are further detailed in Table 3, below.

TABLE 3

Baseline Wander Correction Specification

| Parameters | Specification |
|---|---|
| Output Dynamic Range | +/−100 uA (diff.), (+/−1 V/R$_1$, R$_1$ = 10 kΩ) |
| Output impedance | High |
| Integration Factors | 2 mV/T, 4 mV/T |
| Bandwidth | >100 MHz |

A second-order low-pass filter, as shown in FIG. 13, is cascaded after the summer to preferably flatten the frequency response out to about 31.25 MHz (<1 dB). A minimum overall attenuation of 20 dB at 125 MHz is desirable for the low pass filter. In a sampled system, some aliasing beyond Nyquist frequency (or excess bandwidth) is acceptable, but minimum aliasing is allowed at the sampling frequency. The transmitted data is preferably band-limited to the Nyquist rate.

Preferred performance characteristics of the low pass filter 5 are further detailed in Table 4, below.

TABLE 4

LPF Performance Specification

| Parameters | Specifications |
|---|---|
| Input Dynamic Range | +/−1 V (diff.) |
| Output Dynamic Range | +/−1 V (diff.) |
| Input impedance | High, ~10k. |
| Output impedance | Low |
| Cutoff frequency | 50–60 Mhz. |
| Q (2nd order) | ~1 |
| Input impedance | High, ~10k. |
| Output impedance | Low, <100 |
| DC gain | 1 |

As an alternative arrangement, a third-order Sallen and Key low pass filter as disclosed in a co-pending application by the same inventor of this application, titled "CALIBRATION CIRCUIT," filed concurrently herewith, and hereby incorporated by reference, could be used as filter 5. Similarly, the calibration circuit disclosed therein could also be used to calibrate the low pass filter 5.

Analog-to-digital converters are well know in the art. As will be appreciated, the ADC 6 resolution is often determined by system digital processing requirements. In a preferred embodiment, the Viterbi detector 18 requires an effective 7-bit resolution. Residual baseline wander, echoes, and crosstalk increase the dynamic range by about 200–300 mV, which increases the required resolution. The reduction in dynamic range due to insertion loss for a 100 m cable is approximately 40%. Accordingly, an 8-bit resolution is preferred.

The preferred ADC performance specifications are further detailed in Table 5, below.

TABLE 5

ADC Performance Specification

| Parameters | Specifications |
|---|---|
| Resolution | 8-bits minimum. |
| Sampling frequency | 125 MS/s |
| Source Output Impedance | Low, ~200–400 Ω |

Thus, a transmit canceller including an active resistive summer has been described. Such an active resistive summer has not heretofore been developed for applications such as canceling signals in gigabit channels. Correcting baseline wander through such an active resistive summer has also been described herein.

While the present invention has been described with respect to what is presently considered to be the preferred embodiments, it will be understood that the invention is not limited to the disclosed embodiments. To the contrary, the invention covers various modifications and equivalent arrangements included within the spirit and scope of the appended claims. The scope of the following claims is to be accorded the broadest interpretation so as to encompass all such modifications and equivalent structures and functions.

For example, while preferred circuit configurations and component values have been described, it will be understood that modifications could be made without deviating from the inventive structures. For example, values for the feedback and input resistors $R_f$ and $R_1$ could be changed to obtain higher or lower gains. Also, an active resistive summer could be constructed to sum only the measured signal $V_{tx}$ and the replica signal $V_{txr}$ (or a high-pass version of the replica), for example. Additionally, while the communication channel has been described with respect to a twisted pair of cables, the invention may also be practiced with other communication channels such as optical and wireless channels. Moreover, this invention should not be limited to gigabit transmission rates and can be practiced at any transmission rate requiring the signal processing characteristics of the invention. Of course, these and other such modifications are covered by the present invention.

What is claimed is:

1. An electrical circuit in a communications channel comprising:
   an active resistive summer including:
      an input for a composite signal, the composite signal including a transmission signal component and a receive signal component;
      an input for a replica transmission signal; and
      an output for a receive signal which comprises the composite signal minus the replica signal,
   wherein said active resistive summer includes an operational amplifier having a positive input terminal, a negative input terminal, and an output terminal, said active resistive summer further comprising:
      a feedback element in communication with the output terminal and the negative input terminal;
      a first resistor in communication with the negative input terminal and the composite signal; and
      a second resistor in communication with the negative input terminal and the replica transmission signal.

2. The electrical circuit according to claim 1, wherein the replica transmission signal comprises a high pass signal.

3. The electrical circuit according to claim 1, wherein the replica transmission signal comprises a negative replica transmission signal as a first signal and a low pass replica transmission signal as a second signal, and wherein the second resistor comprises a third resistor and a fourth resistor, and wherein the third resistor is in communication with the first signal and the negative input terminal and the fourth resistor is in communication with the second signal and the negative input terminal.

4. The electrical circuit according to claim 1, wherein the active resistive summer further comprises an input for receiving a current for baseline correction.

5. The electrical circuit according to claim 4, further comprising a charge pump to control the current for the baseline current.

6. The electrical circuit according to claim 5, wherein the charge pump controls current based on an error between an equalized baseline signal and a sliced baseline signal.

7. The electrical circuit according to claim 4, wherein the active resistive summer further comprises an input to receive a common-mode shift current.

8. An electrical circuit in a communications channel comprising:
   means for summing including:
      means for inputting a composite signal; the composite signal including a transmission signal component and a receive signal component;
      means for inputting a replica transmission signal; and
      means for outputting a receive signal which comprises the composite signal minus the replica signal,
   wherein said summing means comprises means for amplifying including a positive input terminal, a negative input terminal, and an output terminal, said summing means further comprising:
   feedback means for communicating with the output terminal and the negative input terminal;
   first resistive means for communicating with the negative input terminal and the composite signal; and
   second resistive means for communicating with the negative input terminal and the replica transmission signal.

9. The electrical circuit according to claim 8, wherein the replica transmission signal comprises a high pass signal.

10. The electrical circuit according to claim 8, wherein the replica transmission signal comprises a negative replica transmission signal as a first signal and a low pass replica transmission signal as a second signal, and wherein the second resistive means comprises a third resistive means and a fourth resistive means, and wherein the third resistive means is for communicating with the first signal and the negative input terminal and the fourth resistive means is for communicating with the second signal and the negative input terminal.

11. The electrical circuit according to claim 8, wherein the summing means further comprises means for receiving a current for baseline correction.

12. The electrical circuit according to claim 11, further comprising means for pumping to control the current for the baseline current.

13. The electrical circuit according to claim 12, wherein the pumping means controls current based on an error between an equalized baseline signal and a sliced baseline signal.

14. The electrical circuit according to claim 11, wherein the summing means further comprises means for receiving a common-mode shift current.

15. A method of reducing a transmission signal from a composite signal in a communications channel comprising the steps of:
   inputting the composite signal into an active resistive summer, the composite signal including the transmission signal component and a receive signal component;
   inputting a replica transmission signal into the active resistive summer; and
   outputting a signal from the active resistive summer which comprises the composite signal minus the replica transmission signal,
      wherein the active resistive summer includes an operational amplifier having a positive input terminal, a negative input terminal, and an output terminal, the active resistive summer further comprising:
         a feedback element in communication with the output terminal and the negative input terminal;
         a first resistor in communication with the negative input terminal and the composite signal; and
         a second resistor in communication with the negative input terminal and the replica transmission signal.

16. The method according to claim 15, wherein the replica transmission signal comprises a high pass signal.

17. The method according to claim 15, wherein the replica transmission signal comprises a negative replica transmission signal as a first signal and a low pass replica transmission signal as a second signal, and wherein the second resistor comprises a third resistor and a fourth resistor, and wherein the third resistor is in communication with the first signal and the negative input terminal and the fourth resistor is in communication with the second signal and the negative input terminal.

18. The method according to claim 17, further comprising a step of inputting a current into the active resistive summer to correct baseline wander.

19. The method according to claim 18, further comprising a step of controlling the current for correcting the baseline wander with a charge pump.

20. The method according to claim 19, wherein the charge pump controls current based on an error between an equalized baseline signal and a sliced baseline signal.

21. The method according to claim 18, further comprising a step of inputting a common-mode shift current into the active resistive summer.

22. A method of reducing a transmission signal from a composite signal in a communication channel, the channel including a first transceiver and a second transceiver each to transmit and receive signals, said method comprising the steps of:
   providing the composite signal, the composite signal comprising the transmission signal of the first transceiver and a receive signal of the second transceiver;
   generating a replica of the transmission signal;
   subtracting the replica signal from the composite signal through an active resistive summer; and
   correcting baseline wander by inputting a baseline correction current into the active resistive summer.

23. The method according to claim 22, further comprising the steps of controlling a common-mode voltage of the active resistive summer by inputting a common-mode shift current into the active resistive summer.

24. A method of correcting baseline wander in a receive signal in a communications channel having a near end and far end, the channel including a first transceiver at the near end and a second transceiver at the far end each to transmit and receive signals, said method comprising the steps of:

providing a composite signal, the composite signal comprising a transmission signal of the first transceiver and a receive signal of the second transceiver;

generating a replica of the transmission signal;

subtracting the replica signal from the composite signal through an active resistive summer; and providing a baseline correction current as an input to the active resistive summer.

25. The method according to claim 24, further comprising the step controlling the baseline correction current with a charge pump.

26. The method according to claim 25, further comprising the step of pumping the charge pump based on an error between an equalized baseline signal and a sliced baseline signal.

27. An apparatus to correct baseline wander in a receive signal in a communications channel having a near end and far end, the channel including a first transceiver at the near end and a second transceiver at the far end each to transmit and receive signals, said apparatus comprising:

a replica transmitter to generate a replica of the transmission signal; and an active resistive summer to subtract the replica signal from a composite signal, the composite signal comprising a transmission signal of the first transceiver and a receive signal of the second transceiver, said active resistive summer including:
a first input to receive the composite signal;
a second input to receive the replica of the transmission signal; and
a third input to receive a baseline correction current.

28. The apparatus according to claim 27, further comprising a charge pump to control the baseline correction current.

29. The apparatus according to claim 28, wherein the charge pump controls the baseline correction current based on an error between an equalized baseline signal and a sliced baseline signal.

30. An apparatus to correct baseline wander in a receive signal in a communications channel having a near and far end, the channel including a first transceiver at the near end and a second transceiver at the far end each to transmit and receive signals, said apparatus comprising:

means for providing a composite signal, the composite signal comprising a transmission signal of the first transceiver and a receive signal of the second transceiver;

means for generating a replica of the transmission signal;

means for subtracting the replica signal from the composite signal; and means for providing a baseline correction current as an input to the subtracting means.

31. The method according to claim 30, further comprising pumping means for controlling the baseline correction current.

32. The method according to claim 31, wherein the pumping means controls the baseline correction current based on an error between an equalized baseline signal and a sliced baseline signal.

33. An electrical circuit in a communications channel, comprising:

an active resistive summer,
wherein the active resistive summer comprises an operational amplifier with an inverting feedback,
wherein the operational amplifier includes a positive input terminal, a negative input terminal, and an output terminal,
wherein the active resistive summer includes:
an input for a composite signal, the composite signal including a transmission signal component and a receive signal component;
an input for a replica transmission signal;
an output for a receive signal which comprises the composite signal minus the replica signal;
a feedback element in communication with the output terminal and the negative input terminal;
a first resistor in communication with the negative input terminal and the composite signal; and
a second resistor in communication with the negative input terminal and the replica transmission signal.

34. The electrical circuit according to claim 33, wherein the replica transmission signal comprises a high pass signal.

35. The electrical circuit according to claim 33, wherein the replica transmission signal comprises a negative replica transmission signal as a first signal and a low pass replica transmission signal as a second signal, wherein the second resistor comprises a third resistor and a fourth resistor, and wherein the third resistor is in communication with the first signal and the negative input terminal and the fourth resistor is in communication with the second signal and the negative input terminal.

36. The electrical circuit according to claim 33, wherein the active resistive summer further comprises an input for receiving a current for baseline correction.

37. The electrical circuit according to claim 36, further comprising a charge pump to control the current for the baseline current.

38. The electrical circuit according to claim 37, wherein the charge pump controls current based on an error between an equalized baseline signal and a sliced baseline signal.

39. The electrical circuit according to claim 36, wherein the active resistive summer further comprises an input to receive a common-mode shift current.

40. An electrical circuit in a communications channel, comprising:

means for summing,
wherein the summing means comprises means for amplifying with means for inverting feedback,
wherein the means for amplifying including a positive input terminal, a negative input terminal, and an output terminal,
wherein the summing means includes:
means for inputting a composite signal, the composite signal including a transmission signal component and a receive signal component;
means for inputting a replica transmission signal;
means for outputting a receive signal which comprises the composite signal minus the replica signal;
feedback means for communicating with the output terminal and the negative input terminal;

first resistive means for communicating with the negative input terminal and the composite signal; and second resistive means for communicating with the negative input terminal and the replica transmission signal.

41. The electrical circuit according to claim 40, wherein the replica transmission signal comprises a high pass signal.

42. The electrical circuit according to claim 40, wherein the replica transmission signal comprises a negative replica transmission signal as a first signal and a low pass replica transmission signal as a second signal, wherein the second resistive means comprises a third resistive means and a fourth resistive means, and wherein the third resistive means is for communicating with the first signal and the negative input terminal and the fourth resistive means is for communicating with the second signal and the negative input terminal.

43. The electrical circuit according to claim 40, wherein the summing means further comprises means for receiving a current for baseline correction.

44. The electrical circuit according to claim 43, further comprising means for pumping to control the current for the baseline current.

45. The electrical circuit according to claim 44, wherein the pumping means controls current based on an error between an equalized baseline signal and a sliced baseline signal.

46. The electrical circuit according to claim 43, wherein the summing means further comprises means for receiving a common-mode shift current.

47. A method of reducing a transmission signal from a composite signal in a communications channel, comprising the steps of:

inputting the composite signal into an active resistive summer, the composite signal including the transmission signal component and a receive signal component, wherein the active resistive summer includes an operational amplifier with inverting feedback, wherein the operational amplifier includes a positive input terminal, a negative input terminal, and an output terminal;

inputting a replica transmission signal into the active resistive summer; and outputting a signal from the active resistive summer which comprises the composite signal minus the replica transmission signal, wherein the active resistive summer further includes:

a feedback element in communication with the output terminal and the negative input terminal;

a first resistor in communication with the negative input terminal and the composite signal; and a second resistor in communication with the negative input terminal and the replica transmission signal.

48. The method according to claim 47, wherein the replica transmission signal comprises a high pass signal.

49. The method according to claim 47, wherein the replica transmission signal comprises a negative replica transmission signal as a first signal and a low pass replica transmission signal as a second signal, and wherein the second resistor comprises a third resistor and a fourth resistor, and wherein the third resistor is in communication with the first signal and the negative input terminal and the fourth resistor is in communication with the second signal and the negative input terminal.

50. The method according to claim 49, further comprising the step of inputting a current into the active resistive summer to correct baseline wander.

51. The method according to claim 50, further comprising the step of controlling the current for correcting the baseline wander with a charge pump.

52. The method according to claim 51, wherein the charge pump controls current based on an error between an equalized baseline signal and a sliced baseline signal.

53. The method according to claim 50, further comprising the step of inputting a common-mode shift current into the active resistive summer.

54. A method of reducing a transmission signal from a composite signal in a communication channel, the channel including a first transceiver and a second transceiver each to transmit and receive signals, the method comprising the steps of:

providing the composite signal, the composite signal comprising the transmission signal of the first transceiver and a receive signal of the second transceiver, generating a replica of the transmission signal;

subtracting the replica signal from the composite signal through an active resistive summer, wherein the active resistive summer includes an operational amplifier with inverting feedback; and correcting baseline wander by inputting a baseline correction current into the active resistive summer.

55. The method according to claim 54, further comprising the step of controlling a common-mode voltage of the active resistive summer by inputting a common-mode shift current into the active resistive summer.

* * * * *